Dec. 10, 1929. W. W. KELLY 1,739,075
POWER TRANSMITTING MECHANISM
Filed Feb. 23, 1928
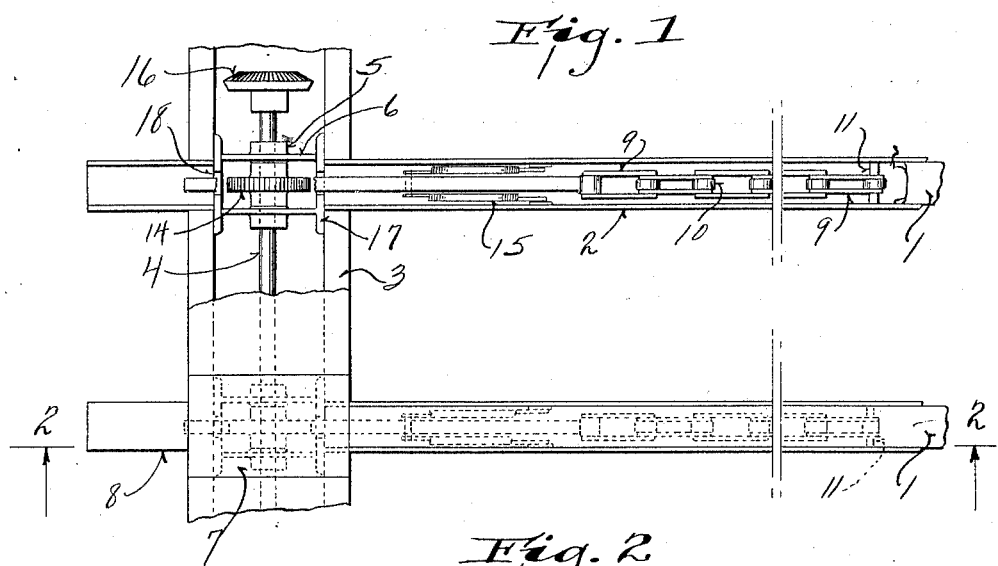
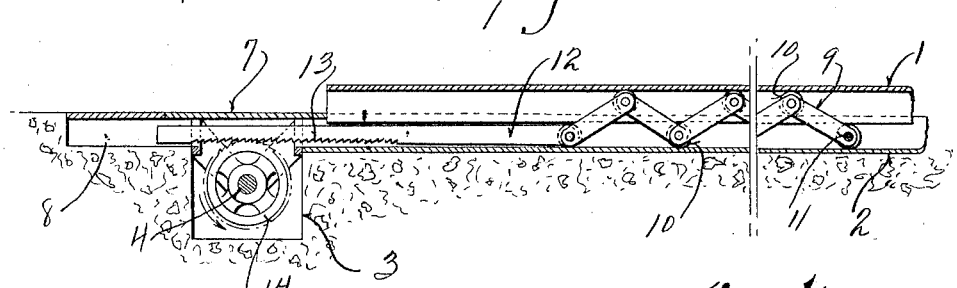
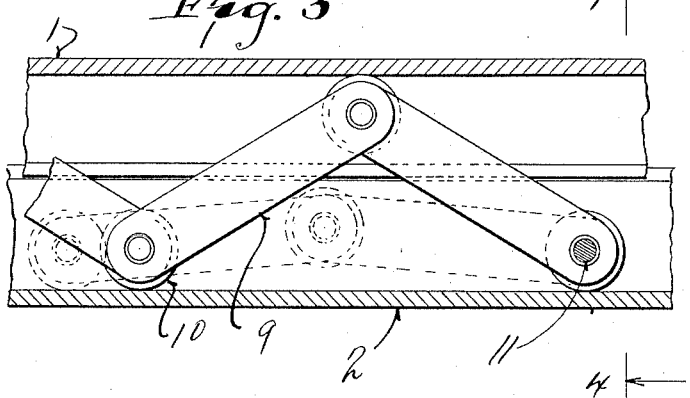
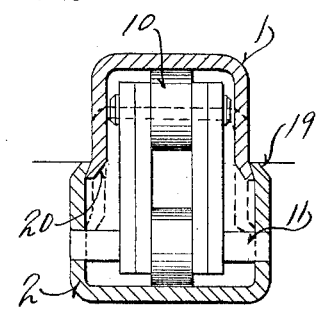
Inventor
Wallace W. Kelly
By
Attorneys Patented Dec. 10, 1929

1,739,075

UNITED STATES PATENT OFFICE

WALLACE W. KELLY, OF RACINE, WISCONSIN

POWER-TRANSMITTING MECHANISM

Application filed February 23, 1928. Serial No. 256,380.

This invention relates to a power transmitting mechanism.

Objects of this invention are to provide a novel form of power transmitting mechanism which is so constructed that a plurality of depressible elements are associated with a movable member, such for example, as a revolubly mounted shaft, in a manner to move the member in one direction only when the elements are successively depressed.

Further objects are to provide the depressible elements in a series, one after the other, so that they may be positioned in a driveway adjacent a door, for instance, and by their successive depression by a passing automobile, will actuate the power transmitting mechanism which in turn may obviously be employed for actuating the doors. Although the immediately described use is one of the principal uses of the power transmitting mechanism, it is to be distinctly understood that the mechanism may be employed for other purposes provided it is actuated or operated in the manner described.

Further objects are to provide a compact and simple type of mechanism in which the units are self-housing or self-contained, so that they may be installed in a practical manner in a driveway, for instance, and will prevent the falling of material into the channels of the units.

A further object is to provide a novel form of mechanism of the order of toggle links associated in a continuous series in each unit, so that a slight depression of the unit will cause a considerable travel of the end link and its associated actuating member.

A further object of this invention is to provide a power transmitting unit adapted for actuation by the weight of a vehicle, which does not require the use of platforms or other extensive surfaces or structures for supporting the automobile, but which instead, is composed of a series of relatively narrow and small elements adapted for depression by the passing vehicle in a regular succession.

An embodiment of the invention is shown in the accompanying drawings in which:

Figure 1 is a fragmentary plan view of the mechanism with parts broken away;

Figure 2 is a transverse sectional view on the line 2—2 of Figure 1;

Figure 3 is a view corresponding to Figure 2 and showing to an enlarged scale a portion of the mechanism, such view showing in full lines its normal position and in dotted lines its depressed position;

Figure 4 is a transverse sectional view on the line 4—4 of Figure 3.

Referring to the drawings, it will be seen that a plurality of depressible elements 1 have been indicated as formed of a channel section, such for example as channel iron. These members are arranged transversely of the driveway and are partially housed and guided by a lower stationary channel iron or member 2. The member 2 extends into a casing 3 within which a revolubly mounted shaft 4 is housed. This shaft is carried by means of bearings 5 supported by brackets 6 within the casing 3. If desired, the casing 3 may be formed merely as a channel in the concrete of the driveway or it may be formed of a separate and distinct metal compartment. At all events, it forms a compartment into which the channel irons 2 open at their forward ends. The casing 3 is covered by means of a removable plate 7 (see Figure 2) and preferably this plate is formed of sections, as shown most clearly in Figure 1. Channel members 8 are positioned in line with the channel members 2, as shown most clearly in Figures 1 and 2, but are inverted. This provides an extension of the channel for the reception of the movable bar or rod, hereinafter described.

Mounted between the members 1 and 2 are a plurality of toggle links 9 whose upper and lower pivotal portions are provided with rollers 10 which contact with the inner surfaces of the members 1 and 2, as shown in Figures 2 and 3. These rollers, therefore, bear against the members 1 and 2 and, consequently, any downward motion of the member 1 will cause the links to approach a straightened position, as indicated in dotted lines in Figure 3. The proportion of the members 1 and 2 is such, however, that the links can never become perfectly straight. Their maximum downward position is indicated in dotted lines in Figure 3. The rear end link is carried by a transverse pin 11 which is fixed in the channel member 2. The forward or free link has its end connected to a slidable bar 12 which is mounted for reciprocation within the member 2. This slidable bar projects across the casing 3 and into the channel member 8, as shown in Figure 2. It is provided with a plurality of ratchet teeth 13 which have abrupt forward faces and slanting rear faces. These ratchet teeth cooperate with the corresponding teeth of a ratchet wheel 14 rigidly mounted upon the shaft 4.

It is to be noted that the shaft 4 is provided with one ratchet wheel for each of the bars 12 and obviously as many of the depressible units and the associated mechanisms may be employed as needed. Preferably, the links 9 are formed in pairs, as shown in Figure 1, so as to provide a very simple structure for the reception of the rollers 10 between members of a pair.

In order to retract the bars 12, pairs of tension springs, indicated by the reference character 15 in Figure 1, are employed. One end of each of these springs is attached to the corresponding casing 2 and the other end attached to the corresponding bar 12, as shown in Figure 1. Thus, the bars 12 will be urged rearwardly and will consequently urge the links into their angular positions shown in Figure 2, thus raising the depressible elements 1.

It is to be distinctly understood that any use may be made of this device, as desired, but in order to simplify the description of the operation, it will be referred to as being actuated by a passing automobile.

Further, it is to be noted that any means may be employed for taking off the power from the shaft 4. For example, the shaft 4 may be provided with a bevel wheel 16 adapted to mesh with a corresponding bevel wheel.

It is to be noted also that the bars 12 merely rest by their own weight upon the ratchet wheels 14 and, consequently, there is no necessity for employing springs or other elaborate and delicate mechanism for maintaining an operative engagement between the reciprocatory bars and the ratchet wheels when the bars are moved in their forward direction. In addition to this, it is preferable to form the brackets 6, which carry the bars for the shaft 4, in pairs and join them by webbed feet 17. These webs are provided with notches 18 on opposite sides for the reception of the bars 12.

In operation, assume that an automobile is passing along the driveway. As its front wheels engage the elements 1 they will depress the elements and correspondingly project the bars 12 forwardly in succession. Each travel of a bar rotates the shaft 4 in the direction of the arrow in Figure 2, and it is to be noted that the bar 12 is moved a material distance for a slight depression of the element 1 as the effect of the toggle links is multiplied by having them in an extended series. Further, as the rear wheels encounter the depressible elements they also will successively actuate these elements and thus a double functioning of the elements is attained with a corresponding operation of the shaft 4. Thus, it will be seen that the shaft 4 is caused to rotate a material number of times by a small travel of the members 1 and, it is to be particularly noted that the usual elaborately supported and impractical platform for the reception of an entire automobile is wholly avoided.

Further, it is to be noted that the channel members 1 and 2 form a housing for the enclosed mechanism and thus protect it from dirt and other matter. In addition to this, these members are provided with cooperative edges, as shown in Figure 4. For instance, the members 2 have their upper edges inwardly turned, as indicated by the reference character 19, and the members 1 have their edges outwardly turned, as indicated by the reference character 20. These reversely turned edges form a tight seal between the members under normal conditions and thus completely house the enclosed mechanism. Further, the depression of the member 1, although it causes the lips 19 and 20 to separate, nevertheless does not produce a large crack or gap between the members 1 and 2, as the member 1 merely slides downwardly as shown in dotted lines in Figure 4, and at all times has its sides positioned in close proximity to the sides of the member 2.

It will be seen that a power transmitting mechanism has been provided which is very simple in construction, which is eminently practical, and which does not require an extended platform or complicated structure.

Further, it will be seen that the mechanism is scarcely noticeable in an ordinary driveway, if it is employed, for instance, for operating garage doors.

Although the invention has been described in considerable detail, such description is intended as illustrative rather than limiting as the invention may be variously embodied and as the scope of such invention is to be determined as claimed.

I claim:

1. Power transmitting mechanism comprising a plurality of elongated casings, a plurality of depressible elements carried within said casings and projecting therefrom, means for limiting the extent of projection of said elements from said casings, reciprocatory bars projecting from the ends of said casings and provided with ratchet teeth, toggle link mechanism carried within and attached to said casings and operatively connecting said elements and said bars for imparting reciprocatory motion to said bars when said elements are depressed, means for elevating said elements from their depressed positions, a shaft revolubly mounted transversely of said casings, and a plurality of ratchet wheels carried by said shaft and operatively related to and supporting said bars, whereby said shaft is rotated when said elements are successively depressed.

2. Power transmitting mechanism comprising a plurality of elongated channel casings, a plurality of elongated channel elements telescopically carried within said casings, a chain of toggle links housed within each of the channel casings and channel elements and bearing against the said casing and element, one end of each of said chains being secured against longitudinal motion adjacent one end of its casing and having its free end extending towards the other end of the casing, bars projecting from the last mentioned ends of said casings and connected to the free ends of said chains, whereby said bars are reciprocated upon depression of the channel elements, means for elevating said channel elements from a depressed position, a revolubly mounted shaft extending transversely of said casings, and mechanism for operatively connecting said shaft with said bars when said bars are moved in one direction, whereby said shaft is rotated upon successive depression of said elements.

3. Power transmitting mechanism comprising a plurality of elongated casings, a plurality of depressible elements carried within said casings and projecting therefrom, means for limiting the extent of projection of said elements from said casings, reciprocatory bars projecting from the ends of said casings and provided with ratchet teeth, toggle link mechanism carried within and attached to said casings and operatively connecting said elements and said bars for imparting reciprocatory motion to said bars when said elements are depressed, means for elevating said elements from a depressed position, a shaft revolubly mounted transversely of said casings, and a plurality of ratchet wheels carried by said shaft and operatively related to and supporting said bars, whereby said shaft is rotated when said elements are successively depressed, said toggle links having rollers at their upper and lower ends.

In testimony that I claim the foregoing I have hereunto set my hand at Racine, in the county of Racine and State of Wisconsin,

WALLACE W. KELLY.